Aug. 22, 1961  W. A. BOUNDS  2,997,271
ACTUATORS

Filed July 25, 1958  2 Sheets-Sheet 1

INVENTOR.
Wallace A. Bounds
BY Wallace A. Bounds

Aug. 22, 1961 W. A. BOUNDS 2,997,271
ACTUATORS
Filed July 25, 1958 2 Sheets-Sheet 2

INVENTOR.
Wallace A. Bounds
BY Wallace A. Bounds

United States Patent Office 2,997,271
Patented Aug. 22, 1961

2,997,271
ACTUATORS
Wallace A. Bounds, 3726 135th Ave. SE.,
Bellevue, Wash.
Filed July 25, 1958, Ser. No. 751,081
8 Claims. (Cl. 251—31)

The invention relates to improvements in actuators in which a fluid or gas under pressure acts against an enclosed piston or diaphragm to actuate a valve or the like; and the objects of the improvements are, first, to provide a means of actuating a valve or the like to the on position once the device is set in operation by an independent force and to the off position automatically in a controlled length of time; and, second, to provide a means of actuating a valve or the like from the off position to the on position with an automatically delayed action.

Figure 1:
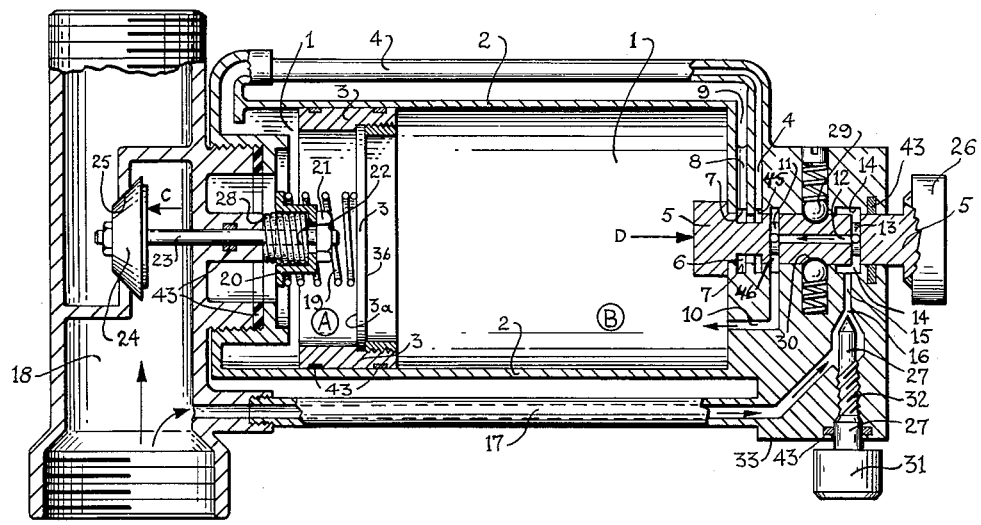
Figure 2:
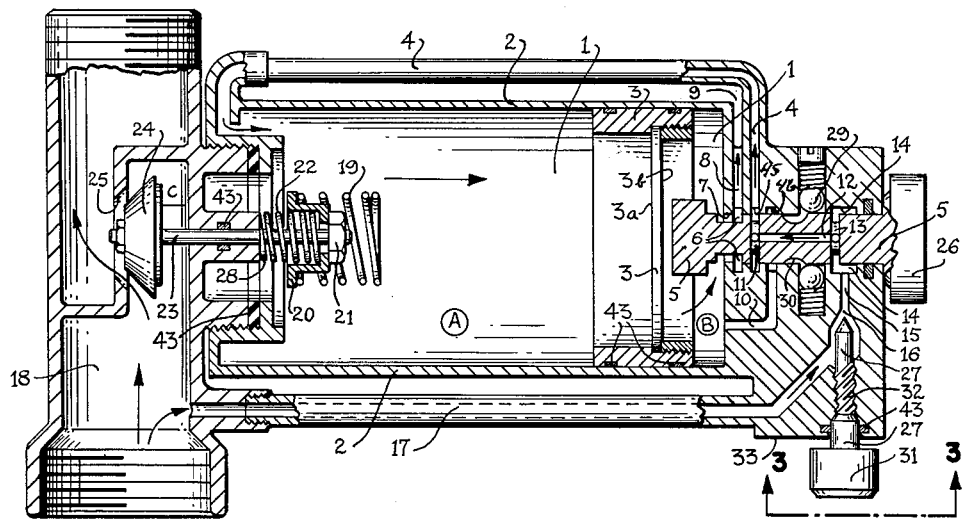
Figure 3:
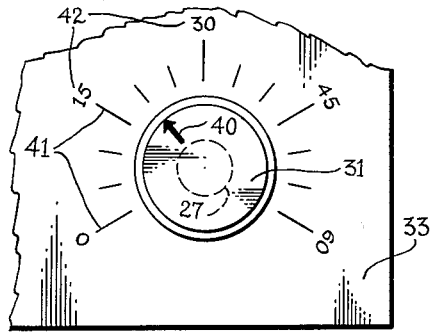
Figure 4:
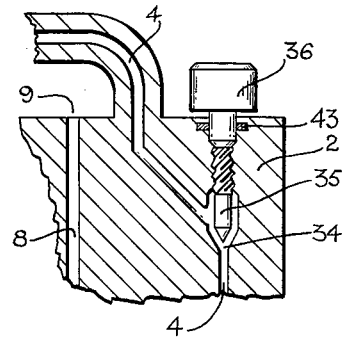
Figure 5:
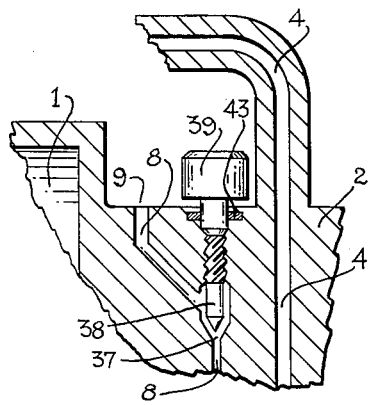
Figure 6:
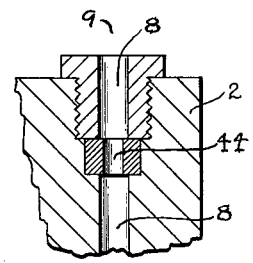

One form of the invention is illustrated in the accompanying drawing wherein the actuator is adapted for use in controlling the time period for lawn sprinklers or the like, in which FIGURE 1 is a sectional plane view approximately through its center axis showing the device having the valve in the off position prior to the start of its timed cycle; FIGURE 2 is the same sectional plane view showing the device approximately half way through its cycle at which point the pilot valve is about to be acted upon which will cause the force from the redirected fluid to act upon the piston on the opposite side to start the second half of its cycle at the conclusion of which it will again actuate the valve to the off position and stop; FIGURE 3 is a view from line 3—3 FIGURE 2 showing details of calibration markings on needle valve variable time set orifice control; FIGURE 4 is a partial view of an alternate means of construction showing the orifice and needle valve control positioned in an intermediate conduit; FIGURE 5 is a partial view of yet another alternate means of construction showing the orifice and needle valve control positioned in the terminal conduit; FIGURE 6 is a partial view of still another alternate means of construction showing a controlled and fixed orifice alone, without the variable restricting means in the form of a needle valve, rendering the period of the actuator's cycle fixed with respect to a given pressure in the system.

The largest part of the actuator is comprised of a chamber space 1 formed by a cylinder 2 which space 1 is separated into dependently variable parts, A and B, by means of a free floating piston 3. One end of conduit 4, a part of a system of conduits one part of which are conduits in the means of distributing fluid and another part of which connects the means of distributing to the parts of the chamber space and out, opens into space A and at its opposite end into conduit 7, into or against the means of distributing non-solid matter in the form of a pilot valve or distributor 5. Annular conduit 7 leads from distributor 5 to conduit 8 and then to atmosphere 9. With distributor 5 in the position shown in FIGURE 1 space A is connected by conduit through conduit 4, conduit 6 in distributor 5, annular conduit 7 and conduit 8 to atmosphere 9 permitting fluid and pressure in space A to escape to atmosphere 9. One end of conduit 10 opens into space B and its opposite end into conduit 46 and into or against distributor 5. With distributor 5 in the position shown in FIGURE 1 space B is connected by conduit through conduit 10, annular conduit 46, conduits 11, 12, and 13 in distributor 5 to conduits 14 and 15 and thence to orifice 16 and conduit 17 and then to fluid line pressure source 18.

In FIGURE 1 line pressure from source 18 is transmitted through the part of the system of conduits: conduit 17, orifice 16, conduits 15 and 14 and then conduits 13, 12 and 11 in distributor 5, then through annular conduit 46 and conduit 10 into space B, then against and multiplied by piston 3 on side 3b. The force exerted by piston 3 is transmitted through a resilient means of transmitting force between the pressure movable member, piston 3, and that which is to be actuated: valve consisting of plug 24 and seat 25. This means of transmitting the force consists of a plurality of resilient members, spring 19 and spring 22, a collar 20, stem 23, and nut 21. Spring 19 is affixed to collar 20 as shown. Spring 22 is confined between collar 20 and face 28 which is a part of the confined space, cylinder 2. Collar 20 is coaxially mounted on stem 23 and the collar is held against the nut 21 by spring 22.

To start the first stroke of the cycle, reset button 26 at the exterior end of distributor pilot valve 5 is depressed by an outside force manually or by other means to the position shown in FIGURE 2 whereupon line pressure from source 18 is transmitted through conduit 17, orifice 16, conduits 15, 14, 13, 12, 11, 45 and 4 into space A; thence against piston 3 on side 3a thus removing the force against compression spring 19 as piston 3 moves away.

As piston 3 moves away from that position shown in FIGURE 1 toward that shown in FIGURE 2 delay compression spring 19, which is stronger than compression spring 22, must first relax prior to the relaxation of spring 22 during which time valve plug 24 continues to be pressed against valve seat 25. When piston 3 moves sufficiently far away during this first of the two strokes of its cycle, from the position shown in FIGURE 1, delay compression spring 19 is relaxed to the point where its force acting against valve plug 24 through collar 20 and valve plug stem 23 just equals the force of compression spring 22 less the line pressure force C from source 18 acting upon plug 24. At this point in time compression spring 22 which is stronger than line pressure force C, and ignoring friction losses, acting between face 28 and collar 20, begins to lift plug 24 from valve seat 25, thus opening the valve.

At the opposite end of space 1 piston 3 at the end of its first stroke acts against distributor pilot valve 5 starting distributor pilot valve 5 to move in the same direction as that in which piston 3 is moving, there being only friction less force D to overcome. When distributor pilot valve 5 has been moved in this direction a part of the distance that it is designed to travel, a force loaded thrusting device consisting of wedging piece or pieces in the form of spring loaded ball 29 or balls 29, 29 act with wedging force into annular groove 30 formed at a selected location on distributor pilot valve 5 thrusting distributor pilot valve 5 the balance of the distance it is permitted to travel to the position shown in FIGURE 1.

This original position rearranges the force transmission from line pressure source 18 into space B via connecting conduit 17, orifice 16, conduits 15, 14, 13, 12, 11, 46 and 10 so that piston 3 travels once again to the position shown in FIGURE 1 wherein valve plug 24 is once again seated on valve seat 25, closing the valve.

A means of variably controlling the amount and rate of fluid passing through the system of conduits which will vary the time between when the valve, plug 24 and seat 25, opens and is again closed, orifice 16 may be restricted variably by needle valve 27 turned by means of knob 31.

As shown in FIGURE 3 knob 31 affixed to needle valve 27 has pointer mark 40 made upon it and face 33 has marks 41 with numerals 42 as shown calibrated so that pointer mark 40 is opposite the appropriate mark 41 for a given time cycle between valve, plug 24 and seat 25, opening and closing.

An alternate means of construction may be resorted to as shown in FIGURE 4 in which orifice 16 is replaced by orifice 34 which is then inserted in conduit 4 and may be variably restricted by needle valve 35 which replaces needle valve 27 and is turned by knob 36, which replaces knob 31.

An additional alternate means of construction is shown in FIGURE 5 in which orifice 16 is replaced by orifice 37 which is then placed in conduit 8 and is variably restricted by needle valve 38 which replaces needle valve 27 and is turned by knob 39 which replaces knob 31.

Yet another alternate means of construction is shown in FIGURE 6 wherein a fixed time cycle with respect to a given pressure from source 18 is obtained by replacing orifice 16 with orifice 44 and placing orifice 44 in conduit 8 as shown, said orifice 44 to have a single cross sectional opening unrestricted further by a needle valve.

Double threads 32 are used on needle valve 27 in order that up to one revolution of knob 31 will render orifice 16 fully open or fully closed.

Seal rings 43 are positioned as shown throughout in order that the entire device may be pressure tight.

In the claims, I will refer to the valve plug 24 and seat 25 as a "flow control valve" to distinguish it from the pilot valve.

Having described the invention what is claimed as new is:

1. A fluid operated actuator interconnected with a source of fluid, said actuator comprising a housing having a chamber, a stem extending through one end of said chamber for transmitting mechanical force from the inside to the outside of said chamber, a pilot valve adjacent the opposite end of said chamber, a pressure movable member movable in the chamber between its opposite ends for alternately effecting the movement of said stem and said pilot valve, means interconnecting the source of fluid with said pilot valve, means interconnecting the pilot valve end of said chamber with said pilot valve, means interconnecting the stem end of said chamber with said pilot valve, exhaust conduit means interconnected with said pilot valve, manually operable means interconnected with said pilot valve for moving said pilot valve to a position effecting communication of said source of fluid with said stem end of said chamber and of said exhaust conduit with said pilot valve end of said chamber whereby fluid under pressure is permitted to pass from said fluid source to said stem end of said chamber and thereby cause said pressure movable member to move in said housing toward said pilot valve and whereby fluid in said pilot valve end of said chamber is permitted to pass through said exhaust conduit means, and resilient thrusting means interconnected with said manually operable means releasable by the engagement of said pressure movable member to urge the pilot valve to a position to interchange the communication of said opposite ends of said chamber with said fluid source and said exhaust conduit means whereby fluid under pressure is permitted to pass from said fluid source to said pilot valve end of said chamber and thereby cause said pressure movable member to move in said housing toward said stem and whereby fluid in said stem end of said chamber is permitted to pass through said exhaust conduit means.

2. An actuator as in claim 1 wherein said pressure movable member is a piston.

3. An actuator device as in claim 1 including a resilient means adapted to move the stem toward said pilot valve.

4. An actuator as in claim 1 including a resilient means adapted to resist the movement of the stem in the initial movement of said pressure movable member toward the pilot valve.

5. An actuator device as in claim 1 including valve means for controlling the rate of flow of fluid through said pilot valve.

6. An actuator device as in claim 1 including a first resilient means adapted to move said stem toward said pilot valve and a second resilient means adapted to resist the movement of the stem in the initial movement of said pressure movable member toward said pilot valve.

7. An actuator device as in claim 1 wherein said exhaust conduit means leads to a port which is open to atmosphere.

8. A fluid operated actuator interconnected with a source of fluid, said actuator comprising a housing having a chamber, a stem extending through one end of said chamber for transmitting mechanical force from the inside to the outside of said chamber, a pilot valve adjacent the opposite end of said chamber, valve means for controlling the rate of flow of fluid through said pilot valve, a pressure movable member movable in the chamber between its opposite ends for alternately effecting the movement of said stem and said pilot valve, a first resilient means adapted to move said stem toward said pilot valve and a second resilient means adapted to resist the movement of the stem in the initial movement of said pressure movable member toward said pilot valve, means interconnecting the source of fluid with said pilot valve, means interconnecting the pilot valve end of said chamber with said pilot valve, means interconnecting the stem end of said chamber with said pilot valve, exhaust conduit means interconnected with said pilot valve, said exhaust conduit means leading to a port which is open to atmosphere, manually operable means interconnected with said pilot valve for moving said pilot valve to a position effecting communication of said source of fluid with said stem end of said chamber and of said exhaust conduit means with said pilot valve end of said chamber whereby fluid under pressure is permitted to pass from said fluid source to said stem end of said chamber and thereby cause said pressure movable member to move in said housing toward said pilot valve and whereby fluid in said pilot valve end of said chamber is permitted to pass through said exhaust conduit means, and resilient thrusting means interconnected with said manually operable means releasable by the engagement of said pressure movable member to urge the pilot valve to a position to interchange the communication of said opposite ends of said chamber with said fluid source and said exhaust conduit means whereby fluid under pressure is permitted to pass from said fluid source to said pilot valve end of said chamber and thereby cause said pressure movable member to move in said housing toward said stem and whereby fluid in said stem end of said chamber is permitted to pass through said exhaust conduit means.

References Cited in the file of this patent

UNITED STATES PATENTS

| | | |
|---|---|---|
| 585,377 | Craig | June 29, 1897 |
| 685,928 | Nethery | Nov. 5, 1901 |
| 685,930 | Nethery | Nov. 5, 1901 |
| 1,004,650 | Hilton | Oct. 3, 1911 |
| 1,707,273 | McCune | Apr. 2, 1929 |
| 2,046,640 | Loftus | July 7, 1936 |
| 2,064,343 | Finley | Dec. 15, 1936 |
| 2,251,323 | Burke | Aug. 5, 1941 |
| 2,301,409 | Iversen | Nov. 10, 1942 |
| 2,418,743 | Baker | Apr. 8, 1947 |
| 2,826,219 | Pfeifer | Mar. 11, 1958 |